United States Patent

[11] 3,626,426

[72] Inventor Richard Steinberg
Encino, Calif.

[21] Appl. No. 6,698

[22] Filed Jan. 29, 1970

[45] Patented Dec. 7, 1971

[73] Assignee TRW Inc.
Redondo Beach, Calif.

[54] PHASED LOCKED LOOPS
7 Claims, 2 Drawing Figs.

[52] U.S. Cl. .......... 340/170, 325/369, 340/171

[51] Int. Cl. .......... H03h 7/20

[50] Field of Search .......... 340/170, 171, 171 A; 325/369

[56] References Cited

UNITED STATES PATENTS

| | | | |
|---|---|---|---|
| 3,181,122 | 4/1965 | Brown .......... | 340/170 |
| 3,444,471 | 5/1969 | French .......... | 325/369 |

*Primary Examiner*—Donald J. Yusko
*Assistant Examiner*—Howard Cohen
*Attorneys*—Daniel T. Anderson, Alfons Valukonis and Edwin A. Oser

ABSTRACT: Apparatus for rapid automatic signal acquisition having multiple phase-locked loops with coherently related output signal frequencies. The first phase-locked loop is responsive to a first input signal for generating a first output signal having substantially the same frequency as the first input signal. The second phase-locked loop is responsive to a second input signal for generating a second output signal having substantially the same frequency as the second input signal. A signal generator provides a phase-lock signal to phase-lock the second loop. Another signal generator generates a signal which indicates phase-lock of both the first and second loops. An integrator having short and long time constant circuit portions is provided in the second loop such that upon being suitably switched it provides either a fast or slow signal response to the second loop. A switch mechanism normally applies the phase-lock signal to the second loop, and switches the integrator so as to provide the second loop with the short time constant circuit portion and accordingly a fast signal response until the second loop becomes phase locked. The switch mechanism then applies the second input signal to the second loop, and so switches the integrator in the second loop as to provide it with the long time constant circuit portion and slow signal response when the phase-lock indicating signal indicates that both loops are phase locked.

Richard Steinberg
INVENTOR

BY Alfons Valukonis
AGENT

Richard Steinberg
INVENTOR

BY
Alfons Valukonis
AGENT

PHASED LOCKED LOOPS

BACKGROUND OF THE INVENTION

1 Field of the Invention

This invention relates generally to phase-locked loops and more particularly to multiple phase-locked loops capable of rapid automatic signal acquisition.

2. Description of the Prior Art

Prior to acquisition of a signal at the input to a phase-lock tracking loop the output frequency of the voltage controlled oscillator may be such as to prohibit phase lock of the loop. Accordingly, means must be employed that will drive the oscillator output frequency to the point at which signal capture can take place. One technique that has been employed in the past for acquiring phase lock of the loop is to employ an appropriate variable voltage input to the control terminals of the oscillator. This applied voltage drives the oscillator output frequency over the range of frequency uncertainty and at a rate that will permit the signal to be captured. The sweep voltage is then removed upon indication of phase lock of the loop. The limitation of this technique is that signal acquisition times may be excessive as they are set by the lowest signal-to-noise ratio for which the equipment is designed to operate and also by the signal response restrictions of the loop. Some prior art phase-locked loop devices of interest are revealed and described in the following U.S. Pat. Nos. 3,167,719; 3,199,037; 3,204,185; 3,209,271; 3,286,188; 3,356,849; 3,358,240; and 3,383,599.

SUMMARY OF THE INVENTION

Apparatus is provided having a first phase-locked loop responsive to a first input signal which generates a first output signal having substantially the same frequency as the first input signal. A second phase-locked loop which is responsive to a second input signal generates a second output signal having substantially the same frequency as the second input signal. Integrator means having a short time constant circuit portion provides the second loop with a fast signal response, and a long time constant circuit portion which provides the second loop with a slow signal response when connected to the second loop, respectively. Means which is responsive to the first output signal generates a phase-lock signal capable of phase locking the second loop. Means are provided which generate an indicator signal indicating phase lock of the loops. Switch means applies the phase-lock signal and connects the short time constant circuit portion to the second loop until the second loop is phase-locked, and applies the second input signal and connects the long time constant circuit portion to the second loop in response to the indicator signal when the loops are phase-locked.

The device of the present invention provides means for obtaining phase lock of coherently related loops requiring only minimum acquisition time, much less than that which can be attained by the employment of prior art sweep circuits. Reliability is also enchanced by reduced circuit complexity. The apparatus of the present invention for obtaining automatic and rapid acquisition of coherently related loops is to initially phase lock a subsidiary loop to a primary loop. When the primary loop acquires its signal, the subsidiary loop tracks the output frequency of the primary loop. Upon lock indication of the primary loop to its input signal the subsidiary loop is switched to its input signal. Since the input and output signal frequencies of the subsidiary loop are now identical, immediate signal acquisition is assured. Multiple coherently related tracking loops find application in tonal ranging systems.

DESCRIPTION OF THE PREFERRED EMBODIMENTS

Figure 1:
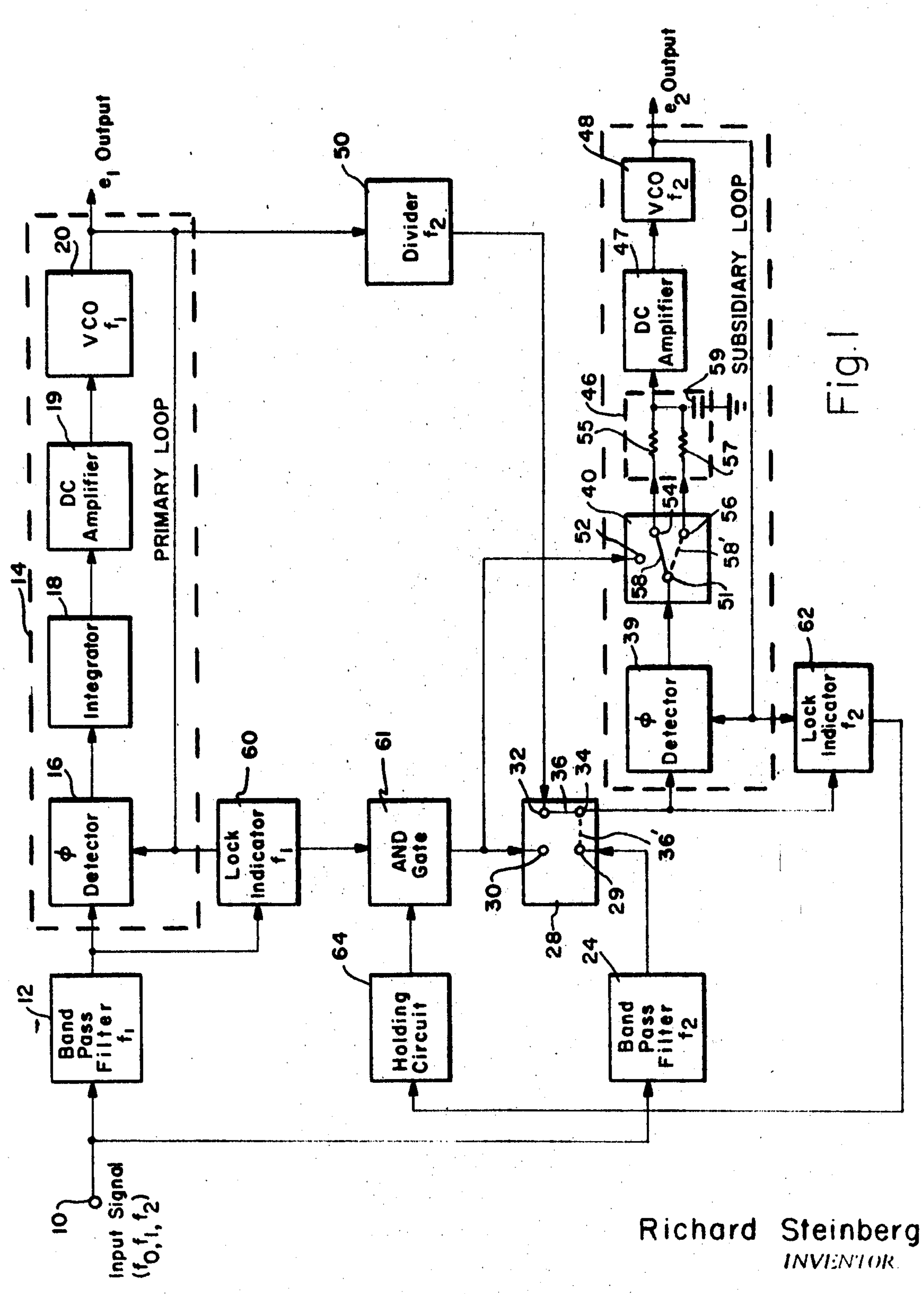
FIG. 1 is a block diagram showing one embodiment of the invention.

FIG. 1 is a block diagram of one preferred embodiment of the invention showing an input terminal 10 to which there is adapted to be applied a frequency multiplexed signal, for example, in which individual subcarrier coherently related signals of frequency $f_1$ and $f_2$ all modulate a common carrier signal of frequency $f_0$. Connected to the terminal 10 there is provided a conventional band-pass filter 12 of the type capable of passing input signals of the frequency $f_1$ to a phase-locked loop 14 and rejecting all other signals including signals of frequency $f_o$ and $f_2$. The phase-locked loop 14 consists of a phase detector 16, low-pass filter integrator 18, DC amplifier 19, and a voltage-controlled oscillator 20. The phase detector 16 is provided with two input signals, one being the input signal of frequency $f_1$ from the band-pass filter 12, and the other the output signal $e_1$ generated by the voltage-controlled oscillator 20 of substantially the same frequency $f_1$ and phase as the input signal from the band-pass filter 12.

Also connected to the terminal 10 is another band-pass filter 24 of the type capable of passing input signals of frequency $f_2$ to a switch 28 and rejecting all other signals including input signals of frequency $f_o$ and $f_1$.

The switch 28 can be a conventional solenoid switch which consists of a terminal 29 connected to the output of band-pass filter 24, a common terminal 30, a terminal 32, and a terminal 34 to which there is attached a movable armature 36. The armature 36 normally connects the terminals 32 and 34 unless the switch is actuated by a signal applied to the common terminal 30 to move it to the dashed-line position 36' to connect the terminals 29 and 34, for a purpose hereinafter to be more fully explained.

Also provided is a second or subsidiary phase-lock loop 38 consisting of a phase detector 39, a switch 40, a low-pass filter integrator 46, a DC amplifier 47, and a voltage-control oscillator 48. The phase detector 39 is connected to the terminal 34, and can be provided with one of two input signals for comparison with a third input signal depending on the position of the switch arm 36. With the armature 36 connecting the terminals 32 and 34 one input signal is provided by means of a frequency divider 50. The frequency divider 50 is responsive to the output $e_1$ of the voltage-controlled oscillator 20 and provides in its output a phase-lock signal of frequency $f_2$ which is a fraction or submultiple of the frequency $f_1$. The second input to the phase detector 39 is obtained from the output of the band-pass filter 24 when the switch 28 is actuated by a signal applied thereto at terminal 30 to cause the armature 36 of the switch to assume the dashed-line position 36', as will hereinafter be more fully explained. The third signal is the output signal $e_2$ from the voltage-controlled oscillator 48. The output of the phase detector 39 is then passed to a switch 40.

The switch 40 is a convention solenoid switch consisting of an armature terminal 51 connected to the phase detector 39, a common terminal 52 in parallel connection with the terminal 30 of the switch 28, a terminal 56, and a movable armature 58 which normally connects the terminal 50 with the terminal 54 unless the switch is actuated by a signal applied to the common terminal 52 to move it to connect the terminal 56 with the terminal 50, as shown in dashed-line position in 58'.

The integrator 46 consists of a first resistor 55 having one end connected to the terminal 54 and a second resistor 57 having one end connected to the terminal 56 of the switch 40. The other ends of the resistors 55 and 57 are connected to each other and one side of a capacitor 59. The resistor 55 is of such value, 100K ohms, for example, that when connected with the capacitor 59, which can have a value of 2 microfarads, into the subsidiary loop 38 by switch 40, there is supplied a small time constant circuit portion which imparts a fast response to the loop. The resistor 57 is such, 1 megohm, for example, that in conjunction with the capacitor 59 there is provided a large time constant circuit portion and accordingly, a slow signal response to the loop 38 when connected therein by the switch 40.

A first lock indicator 60, which can be a phase detector, has two inputs, one being the input signal of frequency $f_1$ from the band-pass filter 12 and the other being the output signal $e_1$ of the voltage-control oscillator 20. When these two signals are in phase and of the same frequency the lock indicator 60 generates a signal to an AND-gate 61 indicating that the primary loop 14 is in phase-locked condition.

A second phase-lock indicator 62 also provides a signal to the AND-gate 61 indicative of the phase-locked condition of the second or subsidiary loop 38. The lock indicator 62 accepts either the signal from the divider 50 or the signal from the band-pass filter 24, depending on the position of movable armature 36. If the armature 36 is in its normal position connecting the terminals 32 and 34, the lock indicator 62 compares the signal from the divider 50 with the signal from oscillator 48, and if there is phase and frequency lock therebetween a signal is generated to a conventional holding circuit 64 which provides a signal to the AND-gate 61. However, if the switch armature is in the dashed-line position 36′ the lock indicator can compare the signal from the band-pass filter 24 with the signal from the voltage-controlled oscillator 48 and provides a signal to the holding circuit 64 upon phase and frequency lock of the loop 38.

Operation of the embodiment shown in FIG. 1 is as follows: Assume that there is applied to the terminal 10 a signal including a subcarrier signal of frequency $f_1$, and a subcarrier signal of frequency $f_2$, both modulating a common carrier signal of frequency $f_0$. The filter 12 rejects the signals of frequency $f_2$ and $f_0$ and passes the signal of frequency $f_1$ to the phase detector 16. The phase detector 16 compares the signal of frequency $f_1$ with the signal from the voltage-controlled oscillator 20 and provides an error signal which is a measure of the phase difference between these two signals to the integrator 18 and amplifier 19 wherein it is smoothed and amplified, respectively. The error signal thus derived is then fed to the voltage-controlled oscillator 20 to control the frequency value of its output signal $e_1$. In this manner the output signal $e_1$ of frequency $f_1$ is caused to track with the input signal of frequency $f_1$ and eventually lock in phase therewith.

Meanwhile with the armature 36′ of switch 28 positioned to connect terminals 32 and 34, the divider 50, which has been tracking the output signal $e_1$ of the loop 14, applies a phase-lock signal of frequency $f_2$ to the phase detector 39. The phase detector 39 compares the phase-lock signal with the output signal $e_2$ of the voltage-controlled oscillator 48 to produce an error-voltage output, which is a measure of the difference in phase between these two signals, and applies it to the terminal 58 of switch 40. With the armature 58 of switch 40 in the position shown to connect terminals 50 and 54, the error signal is passed to the integrator 46, through the circuit portion involving the resistor 55 and capacitor 59, and to amplifier 47. After amplification, the error signal is fed to the voltage-controlled oscillator 48 to control the frequency value of its output signal. Thus, the output signal $e_2$ of frequency $f_2$ tracks the input phase-lock signal from the divider 50 and eventually locks in phase with it.

Upon phase lock of loop 14, the lock indicator 60 generates an indicator signal to the AND-gate 61. Similarly, upon phase lock of the loop 38, the lock indicator 62 generates an indicator signal through the holding circuit 64 to the AND-gate 61. When both lock indicator signals occur simultaneously, the AND-gate generates a signal indicating that such coincidence has occurred to the switch 28, which moves the armature 36 to the dashed-line position 36′ to connect the terminals 29 and 34. Similarly, the AND-gate signal is applied to the switch 40 which moves the armature 58 to the dashed-line position 58 to connect the terminals 50 and 56. With the armatures of switches 28 and 40 in the positions 36′ and 58′, respectively, the input signal of frequency $f_2$ from the filter 24, which is to be tracked, is applied to the phase detector 39, and the time constant of loop 38 is increased by inserting into the loop the circuit portion involving the resistor 57 and the capacitor 59 of the integrator 46. Since the input signal and the output signal $e_2$ are now identical in frequency, and the response time of loop 38 has been decreased, immediate acquisition or phase lock of the input signal by the loop occurs. If, however, the input signal is absent or the loop 38 otherwise fails to acquire the input signal, the lock-indicator signals produced by the lock indicators 60 and 62 will not coincide in the AND-gate 35 and no output signal will be generated thereby. Under these conditions the armatures of the switches 28 and 40 will revert back to their original position 36 and 38, respectively, thus applying the phase-lock signal from the divider 50 to begin anew the sequence of events previously outlined for phase locking of the loop 38.

Figure 2:
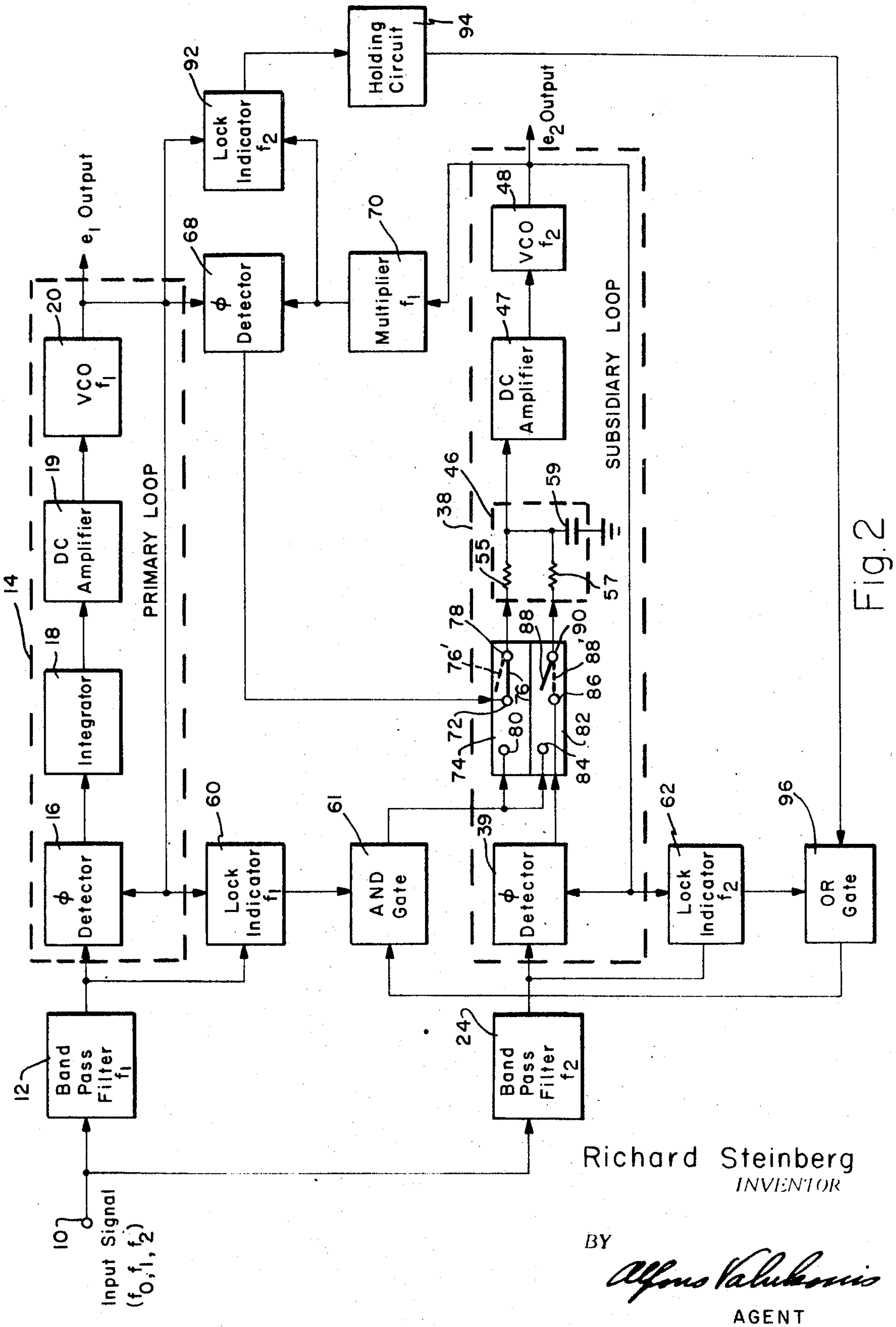
FIG. 2 is a block diagram showing another embodiment of the invention.

Referring now to FIG. 2, there is shown another embodiment of the invention. The apparatus of FIG. 2 is somewhat similar to that of FIG. 1 and like numerals are used to indicate like structure. The embodiment of FIG. 2 differs from that of FIG. 1 in that a phase detector 68 and frequency multiplier 70 are provided to generate the phase-lock signal for phase locking the loop 38.

The phase detector 68 is supplied with an input $e_1$ of frequency $f_1$ from the voltage-controlled oscillator 20 and an input from the multiplier 70 which provides a signal of frequency $f_1$ in response to the output $e_2$ signal of frequency $f_2$ generated by the voltage-controlled oscillator 48 of loop 38. The phase-lock signal output from the phase detector 68 is fed to the terminal 72 of a conventional solenoid switch 74. The switch 74 further includes a movable armature 76 that normally connects the terminal 72, and a terminal 78 to which there is connected the end of resistor 55. Another terminal 80 is connected to the AND-gate 61, and upon a signal being supplied thereto by the AND-gate 61 is capable of moving the armature 76 to the dashed-line position 76′ to disconnect the terminals 72 and 78.

Another solenoid switch 82 is provided with one terminal 84 connected to the AND-gate 61 and another terminal 86 connected to the phase detector 39. An armature 88 normally resides in the position shown, but when the switch is actuated by a signal from the AND-gate 61 the armature moves to the dashed-line position 88′ to connect the terminals 86 and a terminal 90 which is connected to the end of resistor 57.

A lock indicator 92, which also can be a phase detector, has two inputs, one being the signal of frequency $f_1$ from the multiplier 70 and the other being the signal $e_1$ from the voltage-controlled oscillator 20. When these two signals are in phase and of the same frequency, the lock indicator 92 generates a signal to a holding circuit 94. An OR-gate 96 is provided which has two inputs, one from the holding circuit 94 and the other from the lock indicator 62. The output of the OR gate is applied to the AND-gate 61.

Operation of the embodiment of FIG. 2 is somewhat similar to the operation of the embodiment of FIG. 1 in that the output signal $e_1$ of frequency $f_1$ produced by the loop 15 tracks the input signal of frequency $f_1$ and eventually locks in phase therewith as before. Meanwhile with the armature 76 of switch 74 positioned to connect terminals 72 and 76, the phase detector 68 applies a phase-lock signal, which is the error voltage derived from a comparison of the $e_1$ output signal and the input provided by the multiplier 70, to the terminal 72 of switch 74. With the armature 76 in the position shown connecting terminals 72 and 78, the error signal is passed to the integrator 46, through the circuit portion consisting of the resistor 55 and capacitor 59 to the amplifier 47, and then to the voltage oscillator to control the frequency value of its output signal and eventual phase lock of the loop 38.

Upon phase lock of loop 14, as before, the lock indicator 60 generates an indicator signal to the AND-gate 61. Similarly, upon phase lock of loop 38, the lock indicator 92 provides a signal through the holding circuit to the OR-gate 96 which generates a signal to the AND-gate 61. When both lock-indicator signals from the lock indicators 60 and 92 occur simultaneously, AND-gate 61 generates a signal to both switches 74 and 82. The armature 76 moves to the position 76′ to disconnect the terminals 72 and 78 and thus eliminate the circuit portion involving the resistor 55 and capacitor 59 from the circuit of loop 38. Simultaneously the armature 88 of switch 82 moves to the dashed-line position 88′ to connect the terminals 86 and 90 and thus the circuit portion involving the resistor 57 and capacitor 59 into the loop 38 to provide a slow signal response thereto. Closing of the switch 82 also supplies the input signal of frequency $f_2$ from the filter 24 to the phase detector 39. Again, since the input signal and the output signal $e_2$ are now identical, immediate phase lock of the loop 38 occurs. Additional phase-locking indication of the loop 38 is provided by means of the lock indicator 62 which generates a signal to the OR-gate 96 as long as the loop 38 remains locked. If, however, the loop 38 fails to remain locked as indicated by signals from either of the lock indicators 62 and 92, the armature of the switches 74 and 82 will revert to their original positions 76 and 88, respectively, and the sequence of events previously described takes place until phase lock of loop 38 occurs.

While certain embodiments of the invention have been described in detail herein and shown in the accompanying drawing, it will be evident that various additional modifications are possible in the arrangement and construction of its components without departing from the scope of the invention.

I claim:

1. In combination:
   - a first phase-lock loop responsive to a first input signal for generating a first output signal having substantially the same frequency as said first input signal;
   - a second phase-lock loop responsive to a second input signal for generating a second output signal having substantially the same frequency as said second input signal;
   - integrator means having a short time constant circuit portion for providing said second loop with a fast signal response and a long time constant circuit portion for providing said second loop with a slow signal response when connected to said second loop, respectively;
   - means responsive to said first output signal for generating a phase-lock signal capable of phase locking said second loop;
   - means for generating an indicator signal, indicating phase lock of said first and second loops; and
   - switch means for applying said phase-lock signal and connecting said short time constant circuit portion to said second loop until said second loop is phase locked, and for applying said second input signal and connecting said long time constant circuit portion to said second loop in response to said indicator signal when said loops are phase locked.

2. The combination of claim 1 wherein said phase-lock signal-generating means comprises:
   - frequency-divider means responsive to said first output signal for generating said phase-lock signal having the frequency of said second output signal.

3. The combination of claim 1 wherein said indicating signal generating means comprises:
   - first lock-indicator means responsive to said first input and output signals for generating a signal indicating phase lock of said first loop;
   - second lock-indicator means responsive to said second input and output signals for generating a signal indicating phase lock of said second loop; and
   - AND-gate means responsive to said first and second loop phase-lock indicating signals for generating said indicator signal.

4. The combination of claim 1 wherein said phase-lock signal generating means comprises:
   - frequency-multiplier means responsive to said second output signal for generating a signal having the frequency of said first output signal; and
   - phase-detector means responsive to said first output signal and said frequency-multiplier signal for generating said phase-lock signal.

5. The combination of claim 1 wherein said indicating signal generating means comprises:
   - first lock-indicator means responsive to said first input and output signals for generating a signal indicating phase lock of said first loop;
   - second lock-indicator means responsive to said second input and output signals for generating a signal indicating phase lock of said second loop;
   - means for multiplying said second output signal to provide a converted second output signal having the same frequency as said first output signal;
   - third lock-indicator means responsive to said first output signal and said converted second output signal for generating a signal indicating phase lock of said second loop;
   - OR gate means responsive to signals generated by either of said second and third lock-indicator means for generating a gating signal indicating phase lock of said second loop; and
   - AND-gate means responsive to said first loop phase-lock indicating signal and said gating signal for generating said indicator signal.

6. The combination of claim 1 wherein said switch comprises:
   - a first switch for applying said phase-lock signal to said second loop until said second loop is phased locked, and for applying said second input signal to said second loop in response to said indicator signal when said loops are phase locked; and
   - a second switch for connecting said short time constant circuit portion to said second loop until said second loop is phase locked and for connecting said long time constant circuit portion to said second loop in response to said indicator signal when said loops are phase locked.

7. The combination of claim 1 wherein said switch means comprises:
   - a first switch for applying said phase-lock signal to said second loop until said second loop is phase locked, and for connecting said short time constant circuit portion to said second loop until said second loop is phase locked; and
   - a second switch for applying said second input signal to said second loop in response to said indicator signal when said loops are phase locked, and for connecting said long time constant circuit portion to said second loop in response to said indicator signal when said loops are phase locked.

* * * * *